Aug. 4, 1959
J. W. TUCKER
2,897,912
PORTABLE TRESTLE
Filed May 3, 1957
2 Sheets-Sheet 1
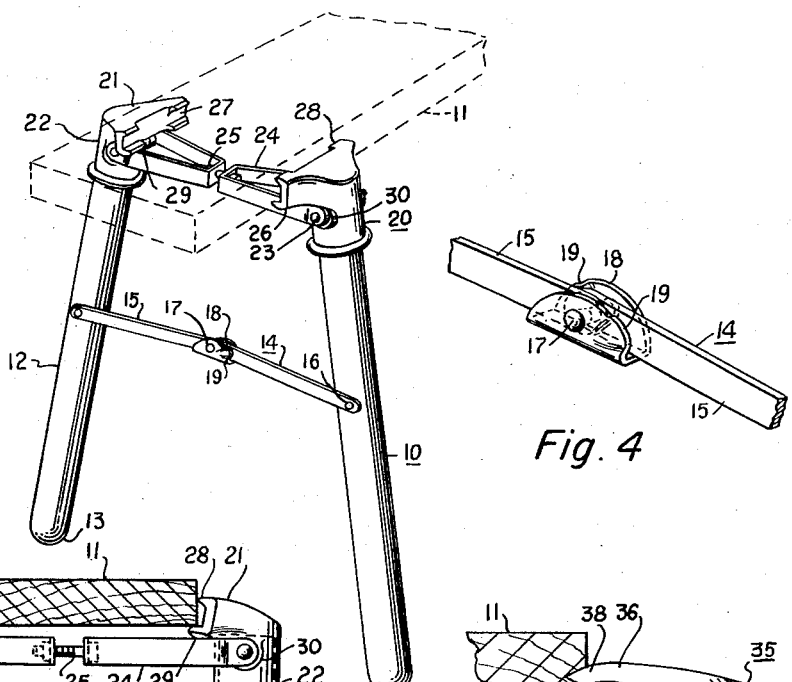
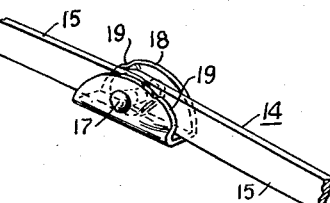
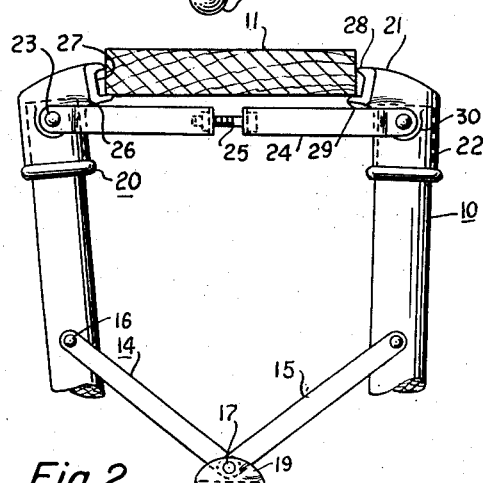
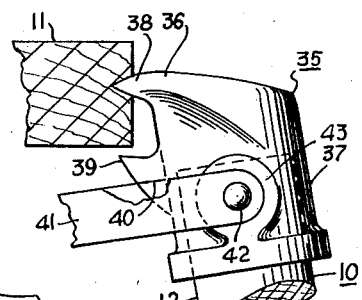
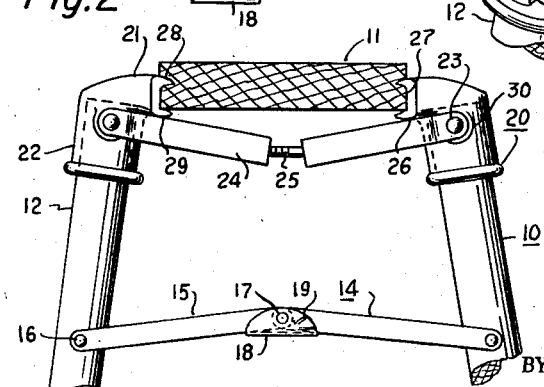
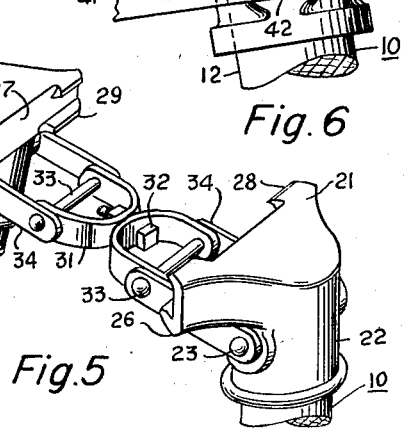
INVENTOR
Jo W. Tucker
BY Ashley & Ashley
ATTORNEYS Aug. 4, 1959 J. W. TUCKER 2,897,912
PORTABLE TRESTLE
Filed May 3, 1957 2 Sheets-Sheet 2
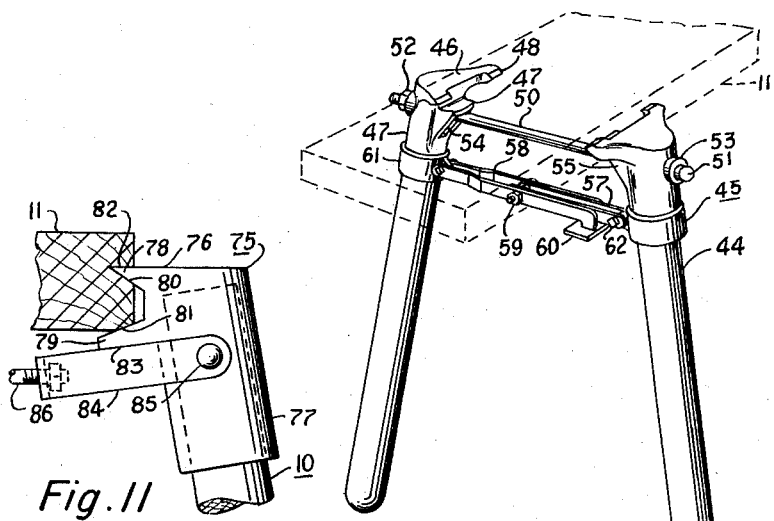
Fig. 7
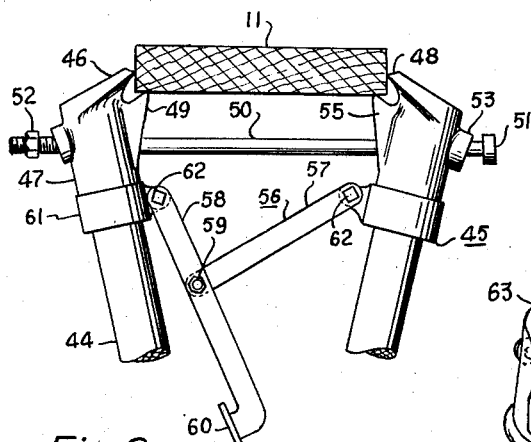
Fig. 11
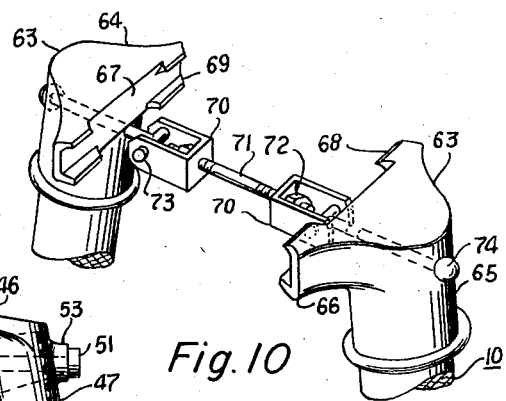
Fig. 8
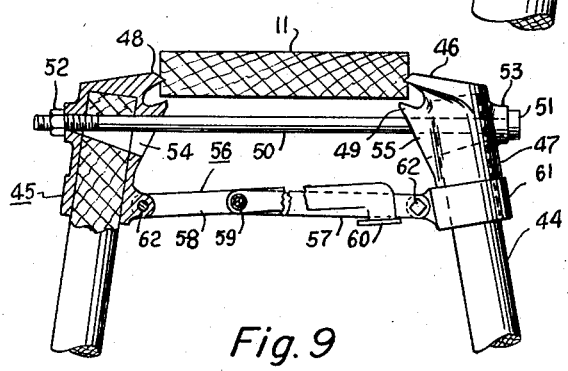
Fig. 10
Fig. 9
INVENTOR
Jo W. Tucker
BY Ashley & Ashley
ATTORNEYS

United States Patent Office 2,897,912
Patented Aug. 4, 1959

2,897,912

PORTABLE TRESTLE

Jo W. Tucker, El Paso, Tex.

Application May 3, 1957, Serial No. 656,831

6 Claims. (Cl. 182—226)

This invention relates to new and useful improvements in portable trestles.

One object of the invention is to provide an improved portable trestle having legs arranged in coacting pairs for positive engagement with a horizontal member to form a support for work or for reaching elevated work and being readily detachable from the member for carrying, transporting and storage.

Another object of the invention is to provide an improved trestle, of the character described, wherein each pair of legs is pivotally connected to permit limited swinging movement of the legs relative to each other and having means at their upper ends for positive engagement with the sides of the horizontal member so as to confine said member therebetween, together with means movable toward the engaging means for spreading the legs apart to engage said engaging means with said member whereby said legs are adapted to be attached to said member in an inverted position.

A further object of the invention is to provide an improved trestle, of the character described, wherein each engaging means includes a bracket having means for bearing against the underside of the horizontal member upon initial engagement of the bracket with said member so as to properly position said bracket with respect to said member.

Another object of the invention is to provide an improved trestle, of the character described, having means for pivotally connecting the brackets of each pair of legs and bearing against said brackets in the erected position of the trestle so as to equalize the forces exerted on said brackets for maintaining the same angular relationship between each leg and the horizontal member.

A further object of the invention is to provide an improved trestle, of the character described, wherein the brackets have projections for embedding in the sides of the horizontal member below its upper surface and means for limiting the penetration of the projections.

Another object of the invention is to provide an improved trestle, of the character described, wherein the brackets have projections for bearing against the lower edges of the horizontal member as well as for embedding in the sides of said member, the projections having coacting surfaces for exerting a compressive force upon the member.

A construction designed to carry out the invention will be hereinafter described, together with other features of the invention.

The invention will be more readily understood from a reading of the following specification and by reference to the accompanying drawings, wherein examples of the invention are shown, and wherein:

Fig. 1 is a perspective view of one end of a trestle constructed in accordance with the invention and showing the horizontal member in broken lines for clarity, Fig. 2 is an end elevational view of a pair of legs and their brackets being engaged with the member, Fig. 3 is a view, similar to Fig. 2 and partly in section, showing the legs erected and their brackets in engaged position, Fig. 4 is a perspective view of the toggle link assembly for spreading the legs, Fig. 5 is a perspective view of a pair of brackets having a modified connection, Fig. 6 is an enlarged elevational view, partly in section, of a modified bracket in engaged position, Figs. 7, 8 and 9 are views, similar to Figs. 1, 2 and 3, of another modification, Fig. 10 is a perspective view of another pair of modified brackets, and Fig. 11 is an enlarged elevational view, partly in section, of a modified bracket in engaged position.

In the drawings, the numeral 10 designates a pair of trestle legs adapted to support a horizontal member 11, which may be a wooden plank, board or other beam member, to provide a trestle embodying the principles of the invention. Although not shown, at least two pairs of legs are employed with one pair being mounted adjacent each end of the member 11. Preferably, each leg includes a standard 12 of wood or other suitable material and having a rounded lower end 13 for engaging the floor or ground (not shown) in different inclined planes.

A toggle link or spreader assembly 14 is provided for adjustably connecting the intermediate portions of the legs to permit pivotal or swinging movement of said legs relative to each other and includes a pair of flat bars or links 15 having their outer ends pivoted to said legs as shown at 16. The inner ends of the link 15 are connected by a pivot pin or rivet 17 which carries a keeper or footpiece 18, of channel or U-shape in cross-section, for engaging said links to facilitate movement of the same into and past alinement with each other (Fig. 3). As shown most clearly in Fig. 4, each flange of the keeper 18 has an inwardly offset portion or dimple 19 for frictional engagement with one of the links so as to hold the same against lateral movement in their extended position. Attention is directed to the fact that the keeper underlies the links and that said links are adapted to pivot upwardly relative to the legs into their extended position.

A bracket 20, having an enlarged head 21, and a depending, cylindrical shank or collar 22, is secured to the upper end of each leg 10 by a transverse pivot pin or bolt 23 extending diametrically through the shank and the upper end of the leg. Each pivot pin 23 carries a clevis or yoke 24 which is adjustably connected by a suitable bolt and nut 25 to the clevis or yoke of the bracket 20 of the other leg for pivotally connecting the legs and their brackets. This adjustable connection permits variation in the distance between the brackets of each pair of legs and coacts with the toggle link assembly 14 in connecting the legs and brackets to the member 11.

The head 21 of each bracket is elongated transversely of the bracket and longitudinally of the member and is offset inwardly in overlying relation to the clevis 24 so as to provide a downwardly-facing shoulder or surface 26 for bearing against said clevis. An upright, substantially flat face or bearing surface 27, of amplified area, is formed on the inner side of the head for bearing against the side of the member 11 (Fig. 3). The face 27 is of elongated, rectangular shape and has a pair of elongated, bevelled teeth or projections 28 extending longitudinally of its upper margin in alined, spaced relationship for embedding in the side of the member 11 upon engagement of the bracket with the member. Similar lugs or projections 29 extend longitudinally of the lower margin of the face in alined, spaced relationship and in parallel, spaced relation to the teeth 28 for bearing against the underside of the member as well as for engaging the underlying clevis 24 with the shoulder 26 of the head 21. The elongation of the face and the longitudinal spacing of the teeth and lugs tend to prevent twisting of the brackets relative to the member. Although the teeth 28 are sharpened for penetrating the lateral surfaces of the member, the lugs 29 are merely tapered to facilitate engagement of the bracket with said member. As shown by the numeral 30, the pivot pin 23 is preferably journaled in opposed bosses formed on the shank 22.

Since wooden boards vary slightly in width, it is frequently necessary to adjust the bolt and nut 25 so that the distance between the faces 27 of opposed brackets 20 is substantially equal to the width of the board to which a pair of trestle legs 10 is to be attached. This adjustment can be easily and quickly made, without tools, by alining the faces with the sides of the board or member and with the legs in their erected or spread position. The legs are then attached by inverting the member 11 and legs and with the lower ends of said legs pivoted inwardly toward each other about the axes of the pins 23. The brackets are placed on each side of the member with the lugs 29 resting on the upwardly-directed underside of said member (Fig. 2). By moving the lower ends of the legs apart and stepping on or otherwise forcing the keeper 18 downwardly or toward the member, the upper ends of said legs and their brackets are pivoted inwardly so as to swing the heads 21 inwardly toward the member. This movement causes the teeth 28 to penetrate the sides of the member and the faces 27 to bear against said sides. The shoulders 26 and lugs 29 engage and force the clevises 24 downwardly or away from the member whereby said clevises pivot downwardly past alinement with the bolt 25 and are held in such position by engagement with said shoulders and lugs to resist disengagement of the brackets from the member (Fig. 3). The forces exerted on the brackets are equalized by the engagement of the clevises therewith so as to maintain the same angular relationship between each bracket and the member. As has been explained, the toggle link assembly 14 is forced to its extended position with its links 15 swung past alinement with each other. When it is desired to detach the legs, it is only necessary to step on or otherwise force the inner ends of the links 15 away from said member or downwardly when said legs are in an upright position.

A modified pivotal connection for the brackets 20 is shown in Fig. 5 and includes a pair of clevises 31 adjustably connected by a bolt and nut 32. The outer ends of each clevis 31 are connected by a pivot pin or bolt 33 to the inner ends of a pair of flat bars or straps 34 which are supported at their outer ends by the pivot pin 23 of each bracket. This adjustable connection functions in substantially the same manner as the adjustable connection of Figs. 1-3, but is more flexible due to the provision of the pivot pins 33.

A modified bracket 35 is shown in Fig. 6 and has an inwardly-offset transversely-elongated head 36 and a depending shank or collar 37 similar to the head 21 and shank 22 of the bracket 20. Instead of the relatively small teeth 28, the head 36 has relatively large teeth or projections 38 at its upper margin and these teeth are relatively blunt in order to limit penetration thereof in the side of the member 11. For bearing against the underside of the member upon initial engagement of the bracket, lugs or projections 39 are provided at the lower margin of the head. When the teeth are embedded in the member, the lugs 39 are spaced from its underside and the remainder of the head does not engage said member. The head has a downwardly-facing shoulder 40, similar to the shoulder 26 of the head 21, which is of sufficient width to bear against the arms of a clevis or yoke 41 which is connected to the shank 37 by a transverse pivot pin 42 extending diametrically through said shank and the upper end of the leg 10. Opposed bosses 43, similar to the bosses 30 of the shank 22, are formed on the shank 37 and the pivot pin 42 is preferably journaled therein.

A modified embodiment of the invention is shown in Figs. 7-9 and includes a pair of legs 44, similar to the legs 10, having brackets 45 at their upper ends for engagement with the horizontal member 11. Each bracket 45 is similar to the bracket 20 and has a similar, inwardly-offset, transversely-elongated head 46 and a depending, cylindrical shank or collar 47. The head 46 has a pair of similar teeth or projections 48 extending longitudinally of its upper margin for embedding in the sides of the member 11. A single lug or projection 49 is formed below the teeth 48 in parallel, spaced relationship for bearing against the underside of the member upon initial engagement of the bracket with said member. As shown in Fig. 9, only the teeth engage the member and the remainder of the bracket 45 and its lug 49 are spaced from said member when the legs are in erected position.

The opposed brackets of each coacting pair of legs 44 are adjustably connected by an elongated element or bolt 50 having an enlarged head 51 on one end and a nut 52 screw-threaded on its opposite end. An apertured boss 53 is formed on the upper, outer portion of each shank 47, below and opposite the head 46, for supporting the outer ends of the bolt 50. In order to permit movement of the legs and brackets relative to the bolt and to each other, a longitudinally-elongated opening or slot 54 is formed in each shank opposite its boss 53 and immediately below the upper portion of the lug 49. As shown, the slot 54 may have side walls 55 extending downwardly from and forming continuations of the ends of the lug. The bolt bears against the upper end of the slots when the legs are in erected position, said slots being of sufficient length to permit inward swinging of the lower ends of the legs toward each other (Fig. 8). In order to increase the flexibility of the connection provided by the bolt, the same is formed of spring steel which permits said bolt to flex without permanent deformation.

For spreading the legs to their erected position, a toggle link assembly 56 is provided and includes pairs of flat bars or links 57 and 58. The inner ends of the links 57, which are of less length than the links 58, are pivotally connected by a pivot pin or bolt and nut 59 to the intermediate portions of said longer links 58. A transverse keeper or foot-piece 60 is secured to the inner ends of the longer links for actuating the assembly 50 and for bearing against the shorter links, said ends being offset to permit pivoting of said links past alinement with each other. Instead of being attached to the legs 44, the outer ends of the links are adapted to be pivotally connected to the lower ends of the brackets 45. An enlarged collar 61 is formed on the lower end of each shank 47 and, as shown at 62, has an apertured ear or eye extending radially therefrom for connection with one pair of the links by a suitable pivot pin or bolt and nut. The legs 44 are erected and their brackets 45 engaged with and disengaged from the member 11 in substantially the same manner as the legs 10 and their brackets 20.

Another modified pair of brackets 63 is shown in Fig. 10, being substantially identical to the brackets 20 and including similar heads 64, shanks 65, downwardly-facing shoulders 66, upright, flat faces 67, teeth 68 and lugs 69. A modified pivotal connection is provided for adjustably connecting the shanks 65 of the brackets 63 and includes a pair of clevises or yokes 70 connected by a screw-threaded rod or elongated stud bolt 71 and nuts 72. The outer ends of each clevis are supported by a pivot pin 73 which forms a part of a T-bolt 74 extending diametrically through the shank 65 and the upper end of the leg 10 immediately below and at a right angle to the head 64 and its face 67. Although not shown, the intermediate portions of the legs are adapted to be connected by the toggle link assembly 14.

A further modification of the invention is shown in Fig. 11 and includes a bracket 75 similar to the bracket 35 and having a similar head 76 and shank 77. A single, coextensive tooth or projection 78 extends longitudinally of the upper margin at the inner side of the head 76 and an underlying co-extensive lug or projection 79 is provided at the lower margin of said head. Instead of having a pair of bevelled surfaces like the teeth 28 and 68, only the underside or lower surface of the tooth 78 is bevelled or inclined, as shown by the numeral 80. The lug has a similar bevelled or inclined upper surface 81 for coacting with the inclined underside 80 of the tooth to compress a portion of the horizontal member 11 therebetween. As shown by the numeral 82, the upper side of the tooth is substantially horizontal so that the only force exerted by said tooth is at a downward and inward inclination. A substantially equal force is exerted by the inclined upper surface 81 of the lug at an upward and inward inclination. In effect, the surfaces 80 and 81 are the reverse equivalent of the bevelled surfaces of the teeth 38 and 48 and exert a compressive rather than an expansive force.

A flat shoulder 83 is formed on the underside of the head 76 and its lug 79 for bearing against a clevis or yoke 84, similar to the clevis 24, which is connected to the shank 77 and leg 10 by a similar, diametrically-extending bolt and nut or pivot pin 85. The clevis 84 is adapted to be adjustably connected to the clevis of an opposed bracket (not shown) by a bolt and nut 86 which are similar to the bolt and nut 25. In addition to coacting with the underside of the tooth, the upper surface 81 of the lug functions in the same manner as the lugs 29 and 69 to properly position the bracket 75 and its tooth 76 upon initial engagement of said bracket and tooth with the member 11. It is noted that the lug remains engaged with the lower portion of the member and deforms such portion.

The improved trestle legs of this invention are readily attachable to and detachable from a board or other horizontal member 11 without tools, and provide a strong and sturdy, light-weight, portable trestle. The top of the board is flat and clear of obstructions for sawing, planing and other work due to the fact that the teeth are at the upper margin of the brackets and embed in the side of said board below its top. Due to the provision of the lugs at the lower margins of the bracket heads, the brackets are easily and quickly positioned for correct engagement with the board and embedding of the teeth therein. In most of the embodiments of the invention, the pivotal connections of the brackets of each pair of legs bear against the undersides of the heads so as to maintain the same angular relationship between each leg and the board. Since only the sides of the board are marred, the same may be subsequently used for building or other purposes. The toggle link assemblies provide simple means for erecting the legs and make possible a positive engagement of the legs with the board. One person can attach the legs because it is unnecessary to support the board. Instead, the legs are inverted and attached to the board in such inverted position. Preferably, the force required to lock the legs in engagement with the member, approximately 150 pounds, is applied by stepping on the keepers or foot-pieces of the toggle assemblies. With the trestle in an upright position, a downward force on the keepers or foot-pieces will release the toggle assembly to permit detachment of the legs. Since the legs are adapted to fold compactly, it is easy to transport the same from job to pob as well as to store the same.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a portable trestle, a pair of legs adapted to support a horizontal relatively wide member, a bracket at the upper end of each leg, lateral projections at the upper margins of the brackets for embedding in the sides of the member, link means extending between and having loose pivotal connection with the lower portions of said brackets to permit limited movement of said brackets relative to each other for embedding and disembedding the projections, toggle means pivotally connecting the legs for spreading the legs to pivot said brackets relative to the link means and embed said projections, and shoulder means on said brackets between said link means and projections for bearing against the underside of the member upon initial engagement of said brackets therewith to position said projections for bearing against the underside of the member upon initial engagement of said brackets therewith to position said projections below its upper surface, the shoulder means moving away from each other and bearing against said link means when said brackets are pivoted to embed said projections so as to urge said link means away from the member for equalizing the forces exerted on said brackets and maintaining the same angular relationship between each leg and the member, said link means being adjustable in length to permit spacing of said brackets in accordance with the width of the member.

2. In a portable trestle as set forth in claim 1 wherein the shoulder means move out of engagement with the member upon embedding of the projections by spreading of the legs.

3. In a portable trestle as set forth in claim 1 wherein the link means includes a pair of links pivotally connected to each other and to the brackets.

4. In a portable trestle, a pair of legs adapted to support a horizontal relatively wide member, a bracket at the upper end of each leg, an inwardly-offset head at the upper end of each bracket, a tooth projecting from the inner side of the head at its upper margin for embedding in the side of the member, a lug extending from the inner side of said head at its lower margin for bearing against the underside of the member upon initial engagement of said head therewith to position the tooth below the top surface of the member, link means extending between and having loose pivotal connection with the brackets below the heads to permit movement of said brackets relative to each other and inward and outward movement of the upper portions of said heads to embed and disembed the teeth, and toggle means pivotally connecting said legs below the link means for spreading said legs to embed said teeth, the lugs and the lower portions of said heads moving outwardly upon pivoting of said brackets and embedding of said teeth whereby the underside of said heads bear against said link means to prevent displacement of said brackets by equalizing the forces exerted on said brackets so as to maintain the same angular relationship between each leg and the member, said link means being adjustable in length to permit spacing of the brackets in accordance with the width of the member.

5. In a portable trestle as set forth in claim 4 wherein the lugs move out of engagement with the member upon embedding of the teeth by spreading of the legs.

6. In a portable trestle as set forth in claim 4 wherein the link means includes a pair of links pivotally connected to each other and to the brackets.

References Cited in the file of this patent

UNITED STATES PATENTS

| | | |
|---|---|---|
| 314,986 | Aenis | Apr. 7, 1885 |
| 381,510 | Rush | Apr. 17, 1888 |
| 574,486 | Jones | Jan. 5, 1897 |

(Other references on following page)

UNITED STATES PATENTS

| | | |
|---|---|---|
| 737,000 | Mortimer | Aug. 25, 1903 |
| 1,153,470 | Wagner | Sept. 14, 1915 |
| 1,226,112 | Pepin | May 15, 1917 |
| 1,243,520 | Helwig | Oct. 16, 1917 |
| 1,261,007 | Beardsley | Apr. 2, 1918 |
| 1,398,471 | Smart | Nov. 29, 1921 |
| 1,485,251 | Davis | Feb. 26, 1924 |
| 2,317,444 | Dalton | Apr. 27, 1943 |
| 2,419,778 | Imes | Apr. 29, 1947 |
| 2,555,503 | Morton | June 5, 1951 |
| 2,561,864 | Hollywood | July 24, 1951 |
| 2,689,154 | Redler | Sept. 14, 1954 |

FOREIGN PATENTS

| | | |
|---|---|---|
| 358,332 | Great Britain | Nov. 12, 1930 |